United States Patent
Ma et al.

(10) Patent No.: US 12,380,109 B2
(45) Date of Patent: Aug. 5, 2025

(54) DATABASE JOIN OPERATIONS WITH EARLY FILTERING

(71) Applicant: Google LLC, Mountain View, CA (US)

(72) Inventors: Xiaobin Ma, Fremont, CA (US); Xun Cheng, Dublin, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/939,141

(22) Filed: Sep. 7, 2022

(65) Prior Publication Data

US 2024/0078237 A1    Mar. 7, 2024

(51) Int. Cl.
*G06F 16/2455* (2019.01)
*G06F 11/34* (2006.01)
*G06F 16/2453* (2019.01)

(52) U.S. Cl.
CPC ...... *G06F 16/2456* (2019.01); *G06F 11/3409* (2013.01); *G06F 16/24537* (2019.01); *G06F 16/24544* (2019.01)

(58) Field of Classification Search
CPC ............ G06F 16/2456; G06F 11/3409; G06F 16/24537; G06F 16/24544
USPC ........................................................ 707/714
See application file for complete search history.

(56) References Cited

U.S. PATENT DOCUMENTS

| | | | |
|---|---|---|---|
| 7,020,661 B1* | 3/2006 | Cruanes | G06F 16/2456 |
| | | | 707/999.102 |
| 10,380,269 B2* | 8/2019 | Bear | G06F 16/24542 |
| 10,642,832 B1* | 5/2020 | Neumann | G06F 40/166 |
| 11,379,478 B2* | 7/2022 | Sun | G06F 16/2264 |
| 2003/0135485 A1* | 7/2003 | Leslie | G06F 16/24545 |
| 2004/0220904 A1* | 11/2004 | Finlay | G06F 16/2228 |
| 2008/0235181 A1* | 9/2008 | Faunce | G06F 16/24545 |
| 2008/0288444 A1* | 11/2008 | Edwards | G06F 16/24545 |
| 2009/0070315 A1* | 3/2009 | Ahmed | G06F 16/24557 |
| | | | 707/999.005 |
| 2010/0082648 A1* | 4/2010 | Potapov | G06F 3/067 |
| | | | 707/800 |

(Continued)

FOREIGN PATENT DOCUMENTS

| | | | | |
|---|---|---|---|---|
| CN | 113742379 A | * | 12/2021 | ....... G06F 16/24537 |
| WO | WO-2010033834 A1 | * | 3/2010 | ............. G06F 12/00 |
| WO | WO-2014052977 A1 | * | 4/2014 | ....... G06F 16/24542 |

OTHER PUBLICATIONS

Zhao et al., "Research on Runtime Query Optimization Technology of Spark SQL", International Journal of Computer Theory and Engineering, vol. 14, No. 1, Feb. 2022, pp. 15-19. (Year: 2022).*

(Continued)

*Primary Examiner* — Phuong Thao Cao
(74) *Attorney, Agent, or Firm* — Lerner David LLP (57) ABSTRACT

Aspects of the disclosure are directed to early filtering of candidate rows for a join operator of a query statement before the join operator is evaluated to generate a result set. Early filtering, e.g., before execution of the join operator, reduces the number of candidate rows fetched from a database during a join operator, which can improve the rate at which queries including join operators are executed by a DBMS for the database. One or more Bloom filters or other probabilistic data structures can be produced and consumed according to different join conditions, allowing for early pruning of unqualified rows during a database scan operation.

20 Claims, 9 Drawing Sheets

(56) References Cited

U.S. PATENT DOCUMENTS

| | | | |
|---|---|---|---|
| 2012/0158698 A1* | 6/2012 | Bestgen | G06F 16/24542 707/718 |
| 2012/0317094 A1* | 12/2012 | Bear | G06F 16/24542 707/E17.017 |
| 2014/0214796 A1* | 7/2014 | Barber | G06F 16/24544 707/714 |
| 2015/0278306 A1* | 10/2015 | Cheng | G06F 16/24545 707/714 |
| 2016/0350347 A1* | 12/2016 | Das | G06F 16/258 |
| 2017/0060970 A1* | 3/2017 | Bhide | G06F 16/9535 |
| 2017/0193024 A1* | 7/2017 | Fung | G06F 16/248 |
| 2017/0262505 A1* | 9/2017 | Xie | G06F 16/90335 |
| 2018/0004810 A1* | 1/2018 | Cheng | G06F 16/24544 |
| 2019/0095486 A1* | 3/2019 | Hopeman, IV | G06F 16/2456 |
| 2019/0121890 A1* | 4/2019 | Chainani | G06F 16/24537 |
| 2019/0311059 A1* | 10/2019 | Bakulina | G06F 16/2456 |
| 2021/0279043 A1* | 9/2021 | Egenolf | G06F 16/24544 |
| 2021/0286812 A1* | 9/2021 | Neugebauer | G06F 16/9035 |
| 2021/0311945 A1* | 10/2021 | Sun | G06F 16/282 |
| 2021/0319130 A1* | 10/2021 | Huang | G06T 3/40 |
| 2023/0401331 A1* | 12/2023 | Xu | H04L 9/0894 |

OTHER PUBLICATIONS

Quoc et al., "Approximate Distributed Joins in Apache Spark", Technical Report, May 15, 2018, 18 pages.

* cited by examiner

DATABASE JOIN OPERATIONS WITH EARLY FILTERING

BACKGROUND

A database management system (DBMS) is a system for managing one or more databases and receiving and resolving queries to the managed database(s). A DBMS can manage one or more attributes, such as tables and relations of data stored on one or more storage devices, forming part of one or more managed databases. The DBMS can read and write to individual rows or columns of the managed tables, including updating, deleting, and adding records. DBMS s can be row-oriented and/or column-oriented. The orientation of the DBMS determines whether scans of tables in the DBMS are performed in row order—as "row scans"—or in column order—as "columnar scans."

A join operator is a type of operation to combine records for tables of a database. Depending on the type of join, e.g., inner join, left outer join, right outer join, etc., different output result sets are generated from records in tables input of the join. Rows of an input table may be qualified or disqualified to form part of a result set to a join operator, depending on conditions (or "predicates") specified in the join operator.

A standard join operator disqualifies rows only at the join operator. In this regard, the conditions of a join operator do not affect how many candidate rows are fetched by an executing DBMS prior to determining which rows are qualified or disqualified to form part of the result set. Accordingly, a standard join operator may fetch rows that are subsequently disqualified. This fetching can be a waste of processing resources and memory utilization if most of the fetched candidate rows are later disqualified by the conditions of the join operator.

BRIEF SUMMARY

Aspects of the disclosure are directed to early filtering of candidate rows for a join operator of a query statement before the join operator is evaluated to generate a result set. Early filtering, e.g., before execution of the join operator, reduces the number of candidate rows fetched from a database during a join operator, which can improve the rate at which queries, including join operators, are executed by a DBMS for the database. One or more Bloom filters or other probabilistic data structures can be produced and consumed according to different join conditions, allowing for early pruning of unqualified rows during a database scan operation.

Overall performance in responding to a query, including join operators, can be improved by fetching only qualified values in a database according to conditions specified in the join operators. Join operations are transparently accelerated using Bloom filters, depending on selectivity; this improvement can use the power of vectorized filtering to reduce the number of rows that need to be processed by the join operation. Aspects of the disclosure can mitigate the waste of computing resources, e.g., measured in processing cycles or wall-clock time, which may otherwise be wasted if many or most of the candidate rows fetched end up being disqualified when the DBMS executes the join operator. The potential waste is more pronounced in more complex types of joins, such as when the DBMS executes nested joins or two-way joins.

Aspects of the disclosure provide for a method, including: determining, by one or more processors, whether to perform early filtering of attributes input to a join operator before executing the join operator; and in response to the determination to perform early filtering: generating, by the one or more processors, a list of outer and inner attributes targeted by the join operator; generating or updating, by the one or more processors, a producer filter map and a consumer filter map, using the list of outer and inner attributes, the producer filter map and the consumer filter map including one or more filters, and applying, by the one or more processors, the one or more filters as part of executing a scan operator, before executing the join operator.

Aspects of the disclosure can provide one or more of the following optional features, in any combination. In some examples, all of the following features are implemented in combination.

The one or more filters are Bloom filters.

The method further includes generating, by the one or more processors, a list of inner attributes from the list of outer and inner attributes; and storing, by the one or more processors, the list of inner attributes in memory.

The method further includes determining, by the one or more processors, that, for an outer attribute, that a corresponding Bloom filter has been generated, and in response, filtering, by the one or more processors, the outer attribute according to the corresponding Bloom filter.

Determining whether to perform early filtering includes determining a ratio between qualified records to total row count of data sources targeted by the join operator; and determining whether to perform the early filtering based on the ratio meeting or not meeting a predetermined ratio.

Determining whether to perform early filtering includes determining whether the join operator specifies conditions in which a first child operator of the join operator has one or more tables associated with the first child operator materialized before one or more tables of a second child operator of the join operator.

Determining whether to perform early filtering includes determining whether the join operator is a hash join operator.

Aspects of the disclosure also provide for a system including one or more processors configured to perform the methods described herein. Aspects of the disclosure also provide for one or more computer-readable storage media storing instructions that, when executed by one or more processors, cause the one or more processors to perform the steps of the methods described herein. In some examples, the computer-readable storage media may be non-transitory, in some examples.

BRIEF DESCRIPTION OF THE DRAWINGS

FIGS. 5A-D are block diagrams of an example of early filtering performed for a received join operator, according to aspects of the disclosure.

DETAILED DESCRIPTION

Overview

Aspects of the disclosure provide for a database management system configured to filter rows in tables of a database before executing a join operator in a query statement. Instead of disqualifying rows during execution of the join operator, a DBMS according to aspects of the disclosure can generate and apply one or more Bloom filters to remove rows that would not be responsive to the conditions of the join operator. The execution of the join operator can be improved, for example through fewer clock cycles or reduced wall-clock time to execute, because unqualified rows are preemptively pruned before the DBMS executes the join operator.

A Bloom filter provides early filtering of values that would otherwise be disqualified when the DBMS executes a join operator. The DBMS can implement a query planner configured to generate a query execution plan with which the DBMS executes a received query statement. A join operator can be represented as a node in the query execution plan, with input operands being the result sets of executing two or more query execution sub-plans. Early filtering as described herein can be applied when the joined table of a child node to the node representing the join operator is materialized before another child node of the join operator is materialized.

During conventional query execution, a query is expressed as an execution plan of nodes representing query operations for performing the query and having attributes as input. The plan includes some nodes that are child nodes of other nodes, called parent nodes. The attributes specified in a child node are retrieved from a cache or other storage system, materialized in temporary memory, and projected before the operation represented by a parent node to the child is executed. For complex queries with nested operators, queries require materializing a large number of attributes before those attributes have been completely consumed during execution of the plan.

The DBMS can determine when one child operator or sub-plan of the join operator in a query execution plan can have its entire output table of result data materialized before another child operator or sub-plan of the join operator is opened. An example of this type of scenario can be when the join operator is a hash join operator.

Viewed as a tree, one side of the plan including a first child operator or sub-plan can be referred to as the build side of the plan, while the other side of the plan including a second child operator or sub-plan can be referred to as the probe side of the plan.

The materializing child is called the build side, which is the side where the execution will build the Bloom filter based on the joinable values the DBMS encounters during the build phase. Materialization refers to the storage of queried data in temporary memory, while the DBMS resolves a received query. Data can be materialized, for example, in main memory different from the database cache, and/or in permanent storage such as disk storage or a solid-state drive. An attribute can refer to a field or column of data within a queried table. A needed attribute is an attribute that is required for performing an operation at a particular execution step in executing a query.

The DBMS generates one or more Bloom filters on the build side, using the results of executing the first child sub-plan. The data structure to represent a Bloom filter can be a bit vector or array, representing the join key values of the build side qualified according to the conditions of the parent join operator.

Once built, the DBMS applies the one or more Bloom filters in conjunction with a scan operator over the results of the probe side of the query execution plan. The DBMS can use a bit vector to test whether a join column dictionary value generated from the scan matches a build side value with some probability. If not, the disqualified rows of the dictionary value are filtered from further processing.

The scan performed by the DBMS on the probe side of the query execution plan can then use the Bloom filter to test whether a join column dictionary value might match the build side values. If not, the one or more disqualified rows are filtered out and not evaluated against the conditions of the join when the DBMS executes the join operator.

Multiple Bloom filters can be generated from several nested join operators and all of them can be pushed to the same probe side scan. The query planner will choose which Bloom filter will be used for filtering first on the same columnar scan, based on the selectivities of the original join predicates. In this context, selectivity can refer to a measure of how much of a set of data would be disqualified by conditions of a join operator. The measure can be, for example, an absolute measure, e.g., a number of rows, and/or a proportion or ratio of disqualified or qualified rows or columns of a set of data.

The DBMS can determine or estimate which of multiple received Bloom filters provide the highest selectivity when evaluated over a set of data, to filter more data and consequently speed up the rest of the Bloom filters.

In some examples, the DBMS can determine automatically or based on user input whether or not to perform early filtering before execution of a join operator. For example, the DBMS can determine whether early Bloom filtering is available or would result in a performance improvement over executing the join operator without early Bloom filtering.

Aspects of the disclosure provide for a number of technical advantages. In the context of performing columnar scans on columnar databases and/or columnar caches, fetching actual columnar values from the cache becomes the most expensive part of the columnar data processing. Filtering the unqualified rows during the columnar scan can improve the join and query performance as a whole, at least because the DBMS processes less data downstream and less data disqualified by the conditions of the join condition are processed when the DBMS executes the join operator. In addition to the hash join operations requiring less computation, the filtering also reduces the computation required for subsequent operations from the hash join, such as columnar projection on the filtered columns.

Example Systems

Figure 1:
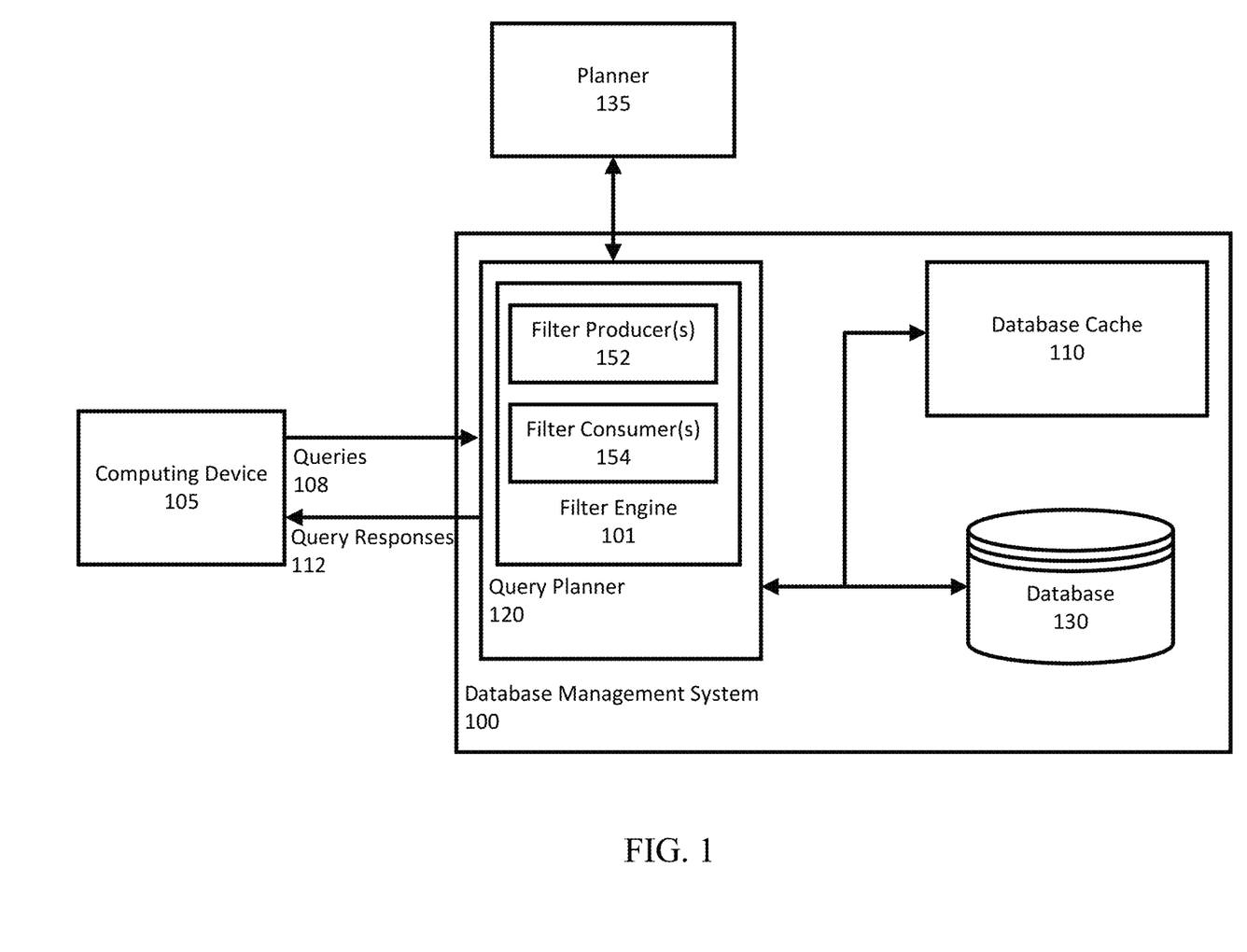
FIG. 1 is a block diagram of an example database management system (DBMS) configured to filter disqualified rows before performing a join operator, according to aspects of the disclosure.

FIG. 1 is a block diagram of an example database management system (DBMS) 100 configured to filter disqualified rows before performing a join operator, according to aspects of the disclosure. The DBMS 100 can include a join filter engine 101, a database cache 110, a query planner 120, and a database 130.

The DBMS 100 is configured to receive queries, such as queries 108 from computing device 105, and resolve queries by providing responses, such as query responses 112. A query response can include one or more rows or columns—or portions of one or more rows or columns—of one or more tables of the database 130. Before providing the query response, the DBMS 100 can optionally process the data, for example by sorting the rows of the response. Operations for processing the query response can be provided as part of a received query, and/or be part of a predetermined pipeline that the DBMS 100 is configured to execute as part of resolving a query.

The computing device 105 can be any of a variety of computing devices configured for querying a database. For example, the computing device 105 can be a personal laptop, a server, a wearable device, a sensor, etc. The computing device 105 can be user-operated and include peripherals or other components for receiving user input. In other examples, the computing device 105 is configured to automatically communicate with the DBMS 100, for example as part of an executed program by the computing device 105.

In some examples, the DBMS 100 can be a hybrid transactional and analytical processing system (HTAP). An HTAP system is a database management system configured to perform both online transaction processing (OTAP) and online analytical processing (OLAP). OTAP systems are configured to coordinate and execute transactions between communicating computing devices. Transactions are recorded and updated in a corresponding database managed by an OTAP system. OLAP systems are configured to receive and resolve queries to a database used as part of analysis of data stored in the database. OLAP and OTAP systems are separately optimized for their respective use cases, with OLAP systems generally optimized for read-only access of data, and OTAP systems optimized for read and write access of queried data.

The database cache 110 can be implemented using any of a variety of different cache technologies, such as L2 cache or L3 cache. The database cache 110 can also be implemented as volatile memory devices, such as various combinations of RAM devices, including SRAM and DRAM devices.

To improve the performance of query resolution, the DBMS 100 can implement the database cache 110. Queries to OLAP systems and HTAP systems supporting OLAP may include requests for data referenced by columns of tables in the database, as opposed to references to individual rows, which is more common in OTAP. To speed up resolution of queries by column, the DBMS 100 can implement the database cache 110.

The query planner 120 receives a query statement and an indication of whether Bloom filter pushdown is to be performed a join operator in the received query statement. The indication may be received, for example, as user input, or automatically received based on predetermined configuration settings available for the query planner 120, among others.

Figure 2:
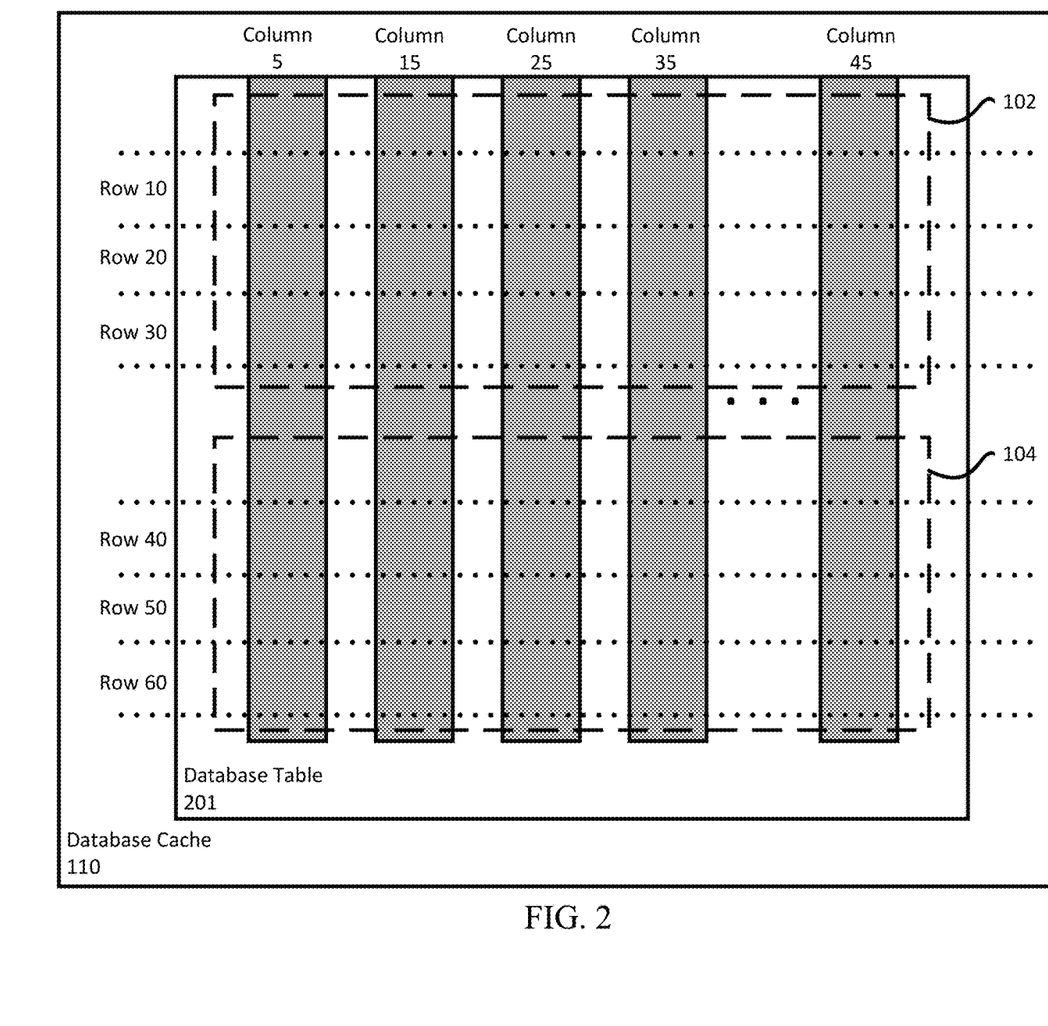
FIG. 2 is a block diagram of the database cache with cached data.

FIG. 2 is a block diagram of the database cache 110 with cached data. In FIG. 2, the database cache 110 is shown as caching portions of a database table 201. Columns 5, 15, 25, 35, and 45 in the database cache 110 can be referenced using a respective columnar unit index and a row index. Each columnar unit 102, 104 has a respective index. Within each columnar unit, each row of the columnar unit has a respective row index. For example, columnar unit 102 and columnar unit 104 have respective columnar unit indices, for example 102 and 104. Each row, such as row 10, row 20, and row 30, of columnar unit 102 can be referenced according to a respective row index. Similarly rows 40, 50, and 60 can be referenced according to a respective row index. The size of each columnar unit can be measured in blocks of data. The number of blocks for a columnar unit can vary from implementation-to-implementation.

The database cache 110 can include any of a variety of different types of memory devices used for caching data, such as main memory, on a solid-state drive, or other types of memory for quickly reading and writing data, etc.

Returning to FIG. 1, the join filter engine 101 is configured to generate query execution plans for executing received queries 108.

The join filter engine 101 is configured to generate different types of plans, according to various optimization or performance enhancing processes. In some examples, the join filter engine 101 can receive input specifying how query execution plans should be generated, and can also generate plans for inspection, for example by a user of the DBMS 100. The join filter engine 101 can, in some examples, receive additional input to modify an existing query execution plan, for example in response to use case-specific requirements in executing a received query.

The join filter engine 101 can receive input queries, parse the queries to identify one or more operators and conditions for applying those operators, and generate a data structure representing an ordered list of operations for the query planner 120 to execute the query.

The query planner 120 can automatically determine row versus column format in a received query and convert the row data to column data. These operations on column values, called vectorized operations, are designed to be executed using hardware-accelerated vectorized (SIMD) instructions that are available on modern CPUs. Operations can be accelerated on hardware accelerators, including hardware accelerators designed and fabricated with those specific DB operations in mind. Selective joins, especially with small tables, will also benefit significantly from the columnar engine, through the use of efficient Bloom filtering, which can be accelerated as described herein.

During a database cache scan, the DBMS reads some or all of the cached data to retrieve data responsive to conditions in a received query. Conditions for how the scan is performed can be specified as parameters in the received query for which the plan is generated.

The database cache scan can be a specialized operation for scanning database caches, such as the database cache 110, in which the cached data is stored physically in column-major format but represented logically in row-major format. During a database cache scan, the DBMS 100 translates columns of cached data from column-major to row-major format. The translation incurs a computational penalty, such as a number of processing cycles per translation. For invalidated blocks, the computational cost to translate the data is a waste, as the cached data is outdated.

As a preliminary step, the DBMS 100 can allocate resources to several processes, which may correspond to physical cores of one or more processors implementing the DBMS 100 and/or refer to processes defined in software and part of an instance of the DBMS 100 executed as part of a process. The DBMS 100 can receive a query and generate a query execution plan for the received query. According to the query execution plan, portions of the data can be allocated to a leader process and from the leader process assigned to multiple different worker processes. The worker processes can be configured to resolve their portion of the query based on an assignment by the leader process and return their results to the leader.

When doing a parallel row store scan, the leader process synchronizes all the worker processes to generate unified invalidated blocks that contain all invalidated blocks. For example, in index scan, each worker process handles an index page and checks the base table row identifier against the unified invalidated blocks. As another example, in bitmap scan, a leader process scans the whole index and checks the row identifier for each indexed row against the unified blocks to create a bitmap. Each worker process handles a part of the bitmap and checks the row identifier against the unified invalidated blocks to retrieve rows corresponding to the base table of the invalidated blocks.

Example Methods

Figure 3:
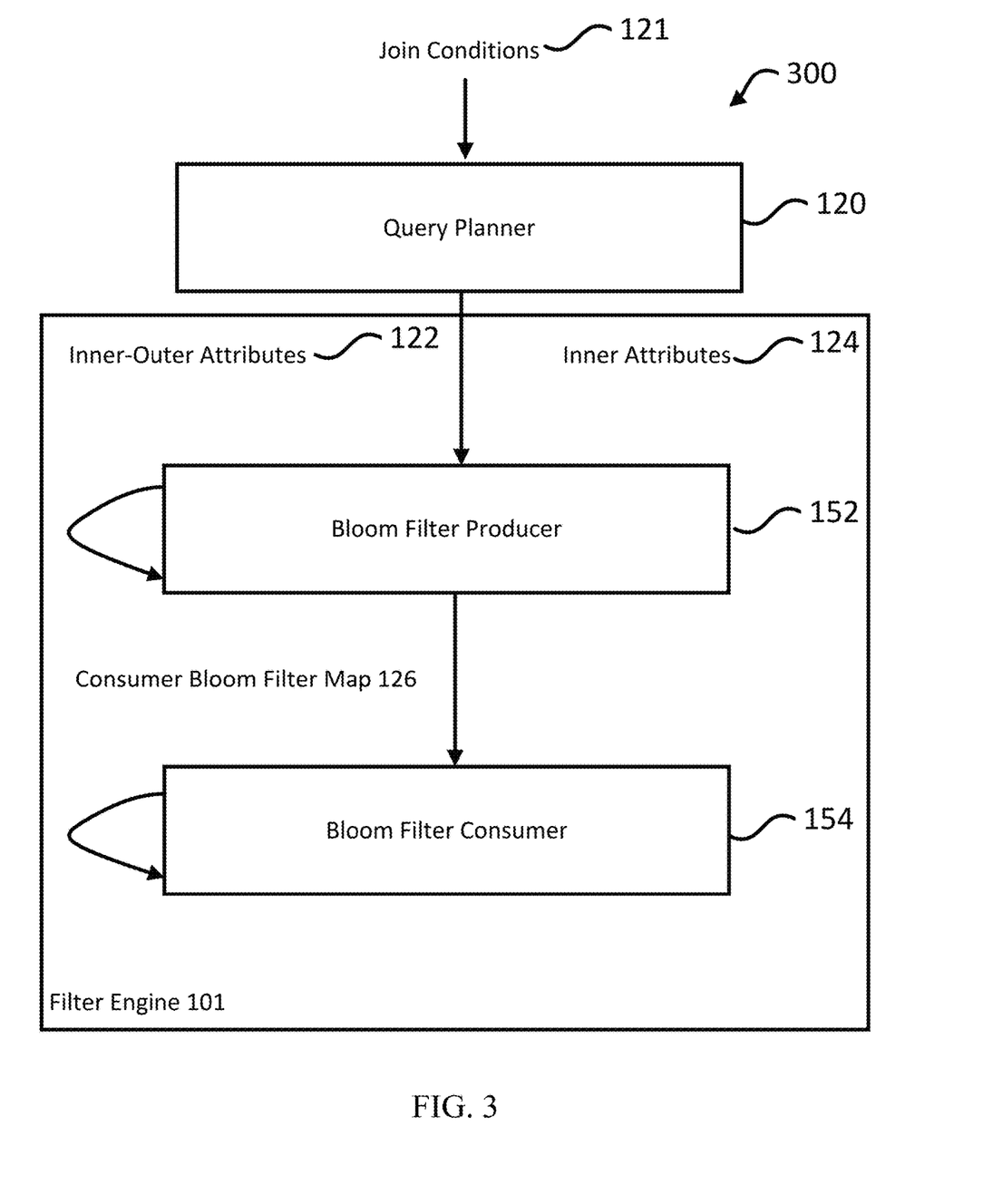
FIG. 3 is a flow chart of an example process for early filtering using a join filter engine, according to aspects of the disclosure.

FIG. 3 is a flow chart of an example process 300 for early filtering using a join filter engine 101, according to aspects of the disclosure. The planner 120 takes the join condition and creates two lists that are fed into the Bloom filter producer 152. The two lists are inner outer attributes 122 and inner attributes 124. The lists correspond to attributes targeted by the received join conditions 121.

The producer 152 generates a Bloom filter producer map and a global consumer Bloom filter map. The producer 152 fills the data in one or more Bloom filters and associates the Bloom filters and their conditions in the global consumer Bloom filter map. The producer 152 can be a hash operator for generating hashes for the Bloom filter or other probabilistic data structure, which can be later queried to determine whether the hash of a new input to the Bloom filter exists in the Bloom filter. The producer 152 can check whether Bloom filters have already been created for the join conditions 121 and stored in the consumer Bloom filter map, before generating the Bloom filter.

The consumer 154 extracts the Bloom filters corresponding to the received join conditions 121 and applies the Bloom filters on results on a dictionary or other structure tracking the contents of a source of data, e.g., a database or a cache. Only results matching the filter are retrieved and passed to the join operator corresponding to the join conditions 121. The consumer 154 can be a scan operator for scanning a data source, e.g., a columnar scan operator for scanning a columnar cache.

Figure 4:
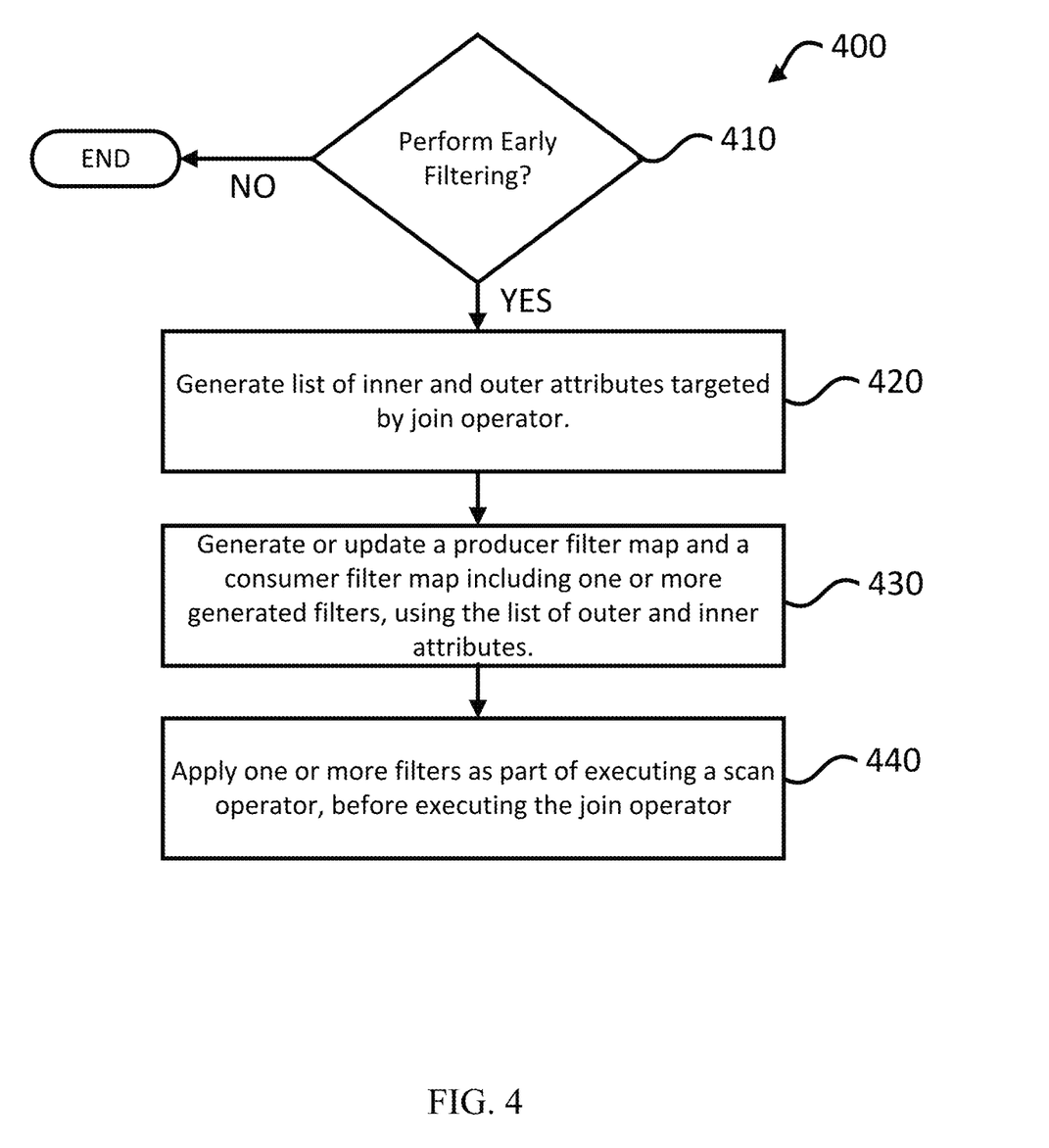
FIG. 4 is a flowchart of an example process for early filtering data for qualified results, before executing a join operator, according to aspects of the disclosure.

FIG. 4 is a flowchart of an example process 400 for early filtering data for qualified results before executing a join operator, according to aspects of the disclosure. For example, a DBMS implementing a join filter engine as described herein can perform the process 400.

According to decision block 410, a DBMS determines whether to perform early filtering, based on received information. If not ("NO") then the process 400 can end. Otherwise, ("YES"), the process 400 continues. For example, the DBMS can receive a query execution plan and determine whether a table for one child node can be materialized before the tables of another child node. In some examples, the DBMS can determine whether the join operator is of a certain type, e.g., a hash join operator, and based on that determination, perform early filtering. As part of determining whether to perform early filtering, the DBMS can estimate the bit vector size of the Bloom filter.

In some examples, as part of determining whether to perform early filtering, the DBMS can estimate the performance benefit over the additional computational cost, e.g., measured in processing cycles, wall-clock time, and/or memory bandwidth utilization, for perform early filtering. In some examples, the DBMS records the ratio of the qualified rows/columns count to total count of rows/columns in the data source targeted by the join operator, e.g., a columnar cache. The ratio can be compared to a predetermined threshold for deciding whether to apply the Bloom filtering to filter the columnar unit dictionary or not. For example, if the ratio is high, e.g., close to one, then early filtering may result in relatively less of a performance enhancement, as few records will be filtered. On the other hand, if the ratio is low, e.g., close to zero, then early filtering can result in a substantial performance improvement as a large portion of records are filtered out before the join operator is executed.

According to block 420, the DBMS generates a list of inner and outer attributes targeted by the join operator. Inner attributes are from the inner side or build side of the join operation, whereas outer attributes are attributes from the outside side or probe side. In some examples, each item can be in the form of:

{{inner_relid, attr_no}, {outer_relid, attr_no, bloom_filter_size}} where inner_relid refers to an inner hash key of an attribute, e.g., a table or record belonging to the inner table of the hash join; attr_no refers to an attribute number or identifier corresponding to the attribute; outer_relid refers to the relational identifier of the scan to be performed on the outer table of the hash join as part of executing the join operator, e.g., a columnar scan; and bloom_filter_size is an estimated size of the bit vector for the Bloom filter to be generated. {linner_relid, attr_no} is an inner attribute, while {outer_relid, attr_no, bloom_filter_size} is the outer attribute. Note that multiple inner attributes may join to multiple outer attributes and are not limited to one-to-one relationships. Later, based on this generated list of inner and outer attributes, the DBMS can generate a set of Bloom filters from the inner table attributes and use the filters on the outer table attributes.

The DBMS can generate a list of inner attributes. The list of inner attributes can be generated by extracting the inner attributes from the list of inner and outer attributes. In some examples, the list of the inner attributes can be of the form:

{{inner_relid1, attr_no1}, {inner_relid2, attr_no2} . . . } where inner_relid1 is the hash key of a first attribute, attr_no1 is the attribute number or identifier for the first attribute, and so on. The list of inner attributes can include the attributes in the same order as in the list of inner and outer attributes. The list of inner attributes is used to store the original attribute numbers of the several attributes, which are changed during Bloom filter creation.

The DBMS can also collect information about the join probe side and the scan operator used as part of performing the join. For example, the DBMS can track columns that have formed a single table condition such as a scan filter condition or other condition containing an attribute from only one table. The single table condition can be used for all row qualification cases during Bloom filtering, using a dictionary or other record of a data source targeted by the join condition. The probe side is a child node from which the Bloom filtering is performed, as described for example with reference to FIGS. 5A-D.

According to block 430, the DBMS generates or updates a producer map and a consumer map, using the list of outer and inner attributes. When building the hash table during hashing, based on the list of inner and outer attributes, the DBMS creates a bit vector for a Bloom filter. Two Bloom filter maps, a producer map and a consumer map, are created for one list of inner and outer attributes. The producer map may be a producer Bloom filter map or any probabilistic data structure. The consumer map may be a consumer Bloom filter map or any probabilistic data structure. A Bloom filter producer of the DBMS can create a Bloom filter for each attribute in the list of inner and outer attributes, as well as a producer map used by the producer to fill data into the Bloom filters. One inner relation attribute can map to multiple filters; however, only one Bloom filter is needed. For example, consider tables T1, T2, and T3, with corresponding attributes T1.*a*, T2.*a*, and T3.*a*. If T1.*a*=T2.*a* AND T1.*a*=T3.*a*, then join T2 and T3 with implicit predicate T2.*a*=T3.*a* first. Then join T2, T3 and T1 with T1.*a*=T2.*a* AND T1.*a*=T3.*a*. In this case, two Bloom filters may be generated based on T1.*a* to filter out T2.*a* and T3.*a*, but one filter could be used to filter out multiple attribute values.

The DBMS also creates a global consumer map, used by the consumer to apply Bloom filters to filter outer table rows. The created Bloom filters are stored in the global consumer map. In some examples, if the global consumer map has already been created, the DBMS can instead update the map with the generated Bloom filters.

Bloom filter pointers are stored in both maps. Therefore, any changes to the Bloom filters are reflected in both maps. The producer fills data into the Bloom filter according to the producer filter map, which tracks the data of attributes to be filtered. The generated Bloom filters are then available in the consumer filter map. Later, the consumer, e.g., a columnar scan operator, searches for Bloom filters for the join conditions of its corresponding join operator and applies the filters to filter out rows/columns of data during the scan.

More than one Bloom filter could be generated for one outer attribute. For example, a query with the join conditions T1.*a*=T2.*a* AND T1.*a*=T3.*a* AND T1.*a*=T4.*a* and the plan ((t1, t4), (t2, t3)). Call the following join J1: T1 JOIN T4 on T1.*a*=T4.*a*. Bloom filter 1 is built to filter T1.A based on T4.A of J1. Call the following join J3: JOIN on T1.*a*=T2.*a* AND T1.*a*=T3.*a* AND T4.*a*=T2.*a* AND t4.*a*=t3.*a*. Bloom filter 2 is built to filter T1.*a* and T4.*a* based on T2.*a* and T3.*a*. Call the following join J2: T2 JOIN T3 on T2.*a*=T3.*a*. The joins can be hash joins. Bloom filter 3 is built to filter T2.*a* based on T3.*a*. A Bloom filter is built to based on T4 to filter T1.*a*. Bloom filter 2 can be simplified to build Bloom filters for T1.*a* and T4.*a* based only on T2.*a*. So, two Bloom filters are generated for T1.*a* and T4.*a* based only on T2.*a*.

To avoid unnecessary Bloom filter creation, the DBMS can perform the following. If a Bloom filter was created for an outer attribute{outer_relid, outer_attr_id} for one join, do not create another one. For example, t1.*a*=t2.*a* AND t1.*a*=t3.*a*. T2 has joined to t3. Now t1 JOIN (t2, t3) (inner).

First, the DBMS can create a Bloom filter BF1 based on T2.*a* to filter T1.*a*. Instead of the DBMS creating a filter based on T3.*a* to T1.*a*, the DBMS does not create a filter because T2.*a*=T3.*a*, and accordingly BF1 can be used for both tables. If a filter is created for an inner attribute, the filter can be used directly. For example, if T1.*a*=T2.*a* AND T1.*a*=T3.*a*, then T2 has joined to t3. Now (T2, T3) join to T1 (inner). The DBMS generates Bloom filter BF1 based on T1.*a* to filter T2.*a*. Instead of creating a Bloom filter based on T1.*a* to filter T3.*a*, the DBMS can use BF1 to filter T3.*a* instead of creating another filter.

In some examples, the hash-key calculation function applied by the DBMS for generating hash keys can be enhanced to not only retrieve the hash key for the join column value, but also retrieves the join column (hash-key) value and length that are then fed into the Bloom filters to create an entry for that value.

After finishing building the hash table, all the join column values have been added into Bloom filters in the producer filter map and consumer filter map. Therefore, the Bloom filters are available to the Bloom filter consumers, e.g., the columnar scan operators, to filter out rows during the scan.

According to block 440, the DBMS applies the one or more filters as part of executing a scan operator, before executing the join operator. During the execution of a scan operator, the operator extracts the Bloom filter from the consumer filter map for the corresponding scan, e.g., a columnar scan for a columnar scan operator, and generates a scan local map. The scan local map can be of the form:
{attr_no1, {bloom_filter1, bloom_filter2, . . . }},
{{attr_no2, {bloom_filter1, bloom_filter2, . . . }}} . . .
where each attribute is associated with one or more Bloom filters. The local scan map is used to determine which filters to apply for the targeted attributes in the join conditions.

For a large table, for example, the fact table in a star join, the probing table is very large and has a large number of duplicate rows even after applying the single table conditions. In this case, for a columnar cache storing the table being filtered, the columnar unit dictionary is comparatively small and has only unique values. Applying filters on the dictionary is more efficient than retrieving all of the values. In some examples, the DBMS can apply the following for filtering the dictionary of a native scan. First, the single table condition is applied to the columnar unit values and to retrieve a result bit vector. The DBMS can apply single table conditions, range conditions, logical conditions, e.g., not equal, is null, is not null, like, etc., on the dictionary to eliminate unqualified dictionary entries.

The DBMS can retrieve and evaluate the qualified dictionary entries (values) against the Bloom filter to get a qualified dictionary entry bit vector. The retrieval at this step happens on a relatively small dictionary compared to the full scan operator, without filtering. The DBMS can evaluate the result bit vector against the dictionary entry bit vector to eliminate the unqualified join values.

In some examples, applying Bloom filtering on the dictionary is not more efficient than filtering the column unit result. In those examples, the DBMS can skip the dictionary filtering as described above, and instead filter on the columnar unit result directly. Cases in which it may be more efficient to filter directly on the columnar unit result include:

1. The column unit result size after applying a single table condition is smaller than the dictionary size.
2. There are too many single table conditions, e.g., in excess of a predetermined threshold, so dictionaries are possibly evaluated repeatedly. For examples, conditions such as "a>100 and a<10,000," the dictionary entries between 100 and 10,000 are evaluated twice. In this simple example, the native scan may be used to evaluate both conditions in one scan of the columnar unit. However, if the condition becomes complicated like "a>100 AND b<99 AND (c<88 OR a<10,000)" it is not easy to consolidate these single table conditions on a column
3. Voxel scan is a black box to use the dictionary and single table condition for filtering.

In some examples, when building Bloom filters, generation can be distributed across multiple workers, according to a distributed processing scheme. For example, each of multiple parallel workers builds their own Bloom filters with the data the worker is working with. After all workers finish building the private Bloom filters, all these Bloom filters are combined into shared dynamic memory and mapped to the corresponding producer filter and consumer filter maps.

In an example distributed processing scheme, one worker handles creating shared Bloom filters in dynamic shared memory and creating dynamic shared memory space, for example a shared Bloom filter map to transfer the shared Bloom filter information to all other workers. The shared bloomed filter map can include a count of the number of Bloom filters created, as well as a list of inner attributes and a corresponding dynamically shared Bloom filter. Each item in the list can take eight bytes, for example. The Bloom filter address is the unmapped dynamic shared area address. The shared Bloom filter map is broadcast to all workers. Except for the worker that creates shared Bloom filters in dynamic shared memory, all other workers create Bloom filters in the process-private memory and fill data into the private Bloom filters, as described herein.

After all workers finish building their own Bloom filters, each worker except for the worker that created the shared Bloom filters combines its private Bloom filters into the shared Bloom filters. To use the SIMD instruction to efficiently consolidate the Bloom filters the real Bloom filter, bitset, is located on the 32 bytes boundary, which may not be the same as the allocated memory address, bitvector. Since the shared Bloom filters are created in the dynamic shared memory, the real Bloom filter bitset and the allocated shared memory address bitvector are mapped to different addresses in parallel workers.

Each worker iterates on the shared Bloom filter map in the dynamic shared memory. For each shared Bloom filter, a respective worker creates a private Bloom filter without allocating bitvector and maps the dynamic shared area address of the shared Bloom filter. The worker then copies all Bloom filter "control" information from the shared Bloom filter to the private Bloom filter and re-calculates the process-private bitset address. After all these are done, each worker has its own private Bloom filter with the shared Bloom filter bit vector in dynamic shared memory.

The new private Bloom filters only contain the Bloom filter "control" information but do not allocate the bit vector. All the workers use the same shared bit vector in the dynamic shared memory. Finally, the old private Bloom filters in the global Bloom filter map consumer filter map are replaced with the new private Bloom filters that will be used later to filter out join rows during hash join probing.

Figure 5A:
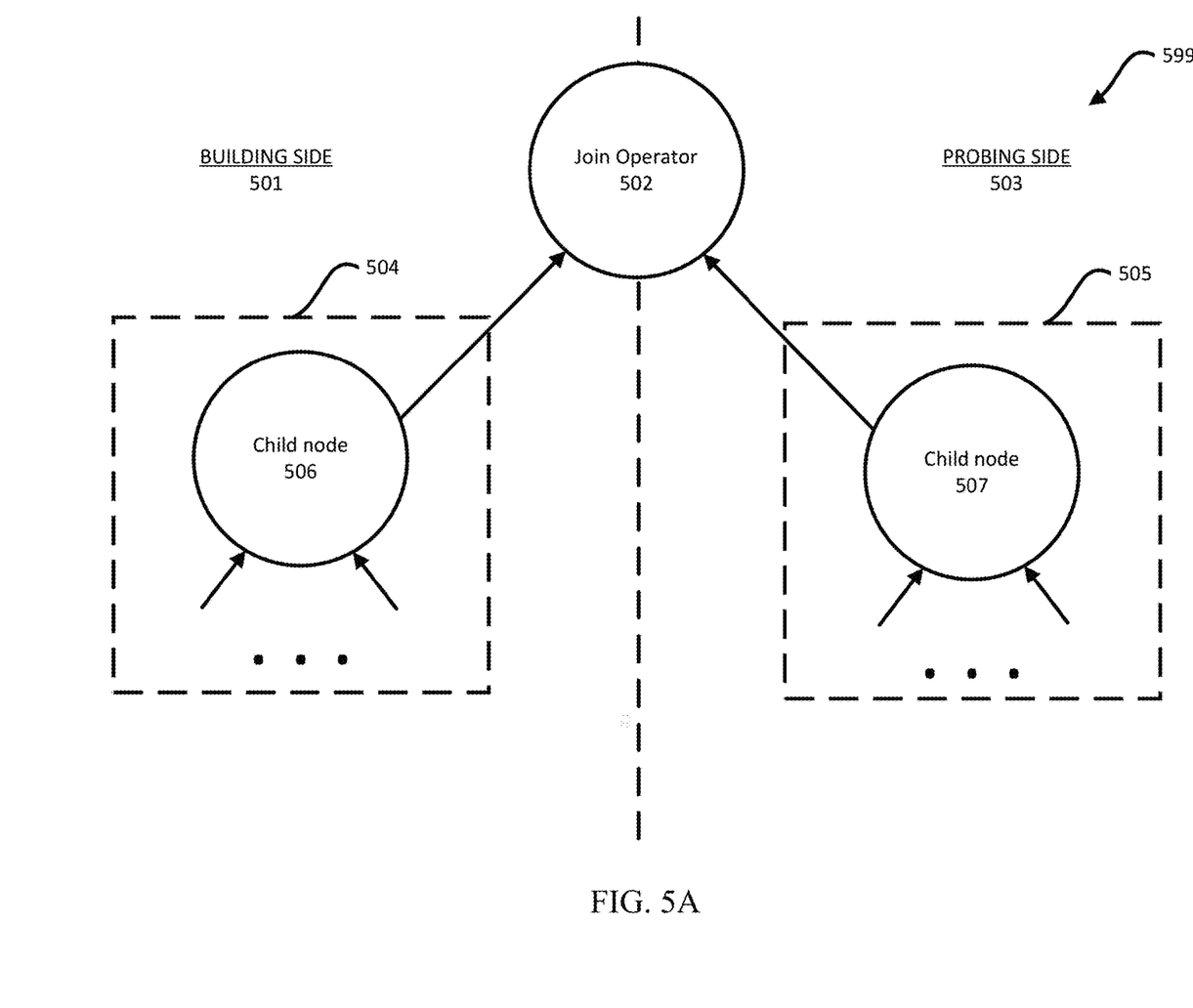
FIG. 5A shows a query execution plan having a join operator node, with sub-execution plans.

FIGS. 5A-D are block diagrams of an example of early filtering performed for a received join operator, according to aspects of the disclosure. FIG. 5A shows a query execution plan 599 having a join operator node 502, with sub-execution plans 504 and 505. Sub-execution plan 504 has a child node 506 relative of the join operator node 502, and sub-execution plan 505 has a child node 507 relative of the join operator node 502. One side of the query execution plan 599 is marked as a build side 501, and the other side of the query execution plan 599 is marked as a probe side 503.

Figure 5B:
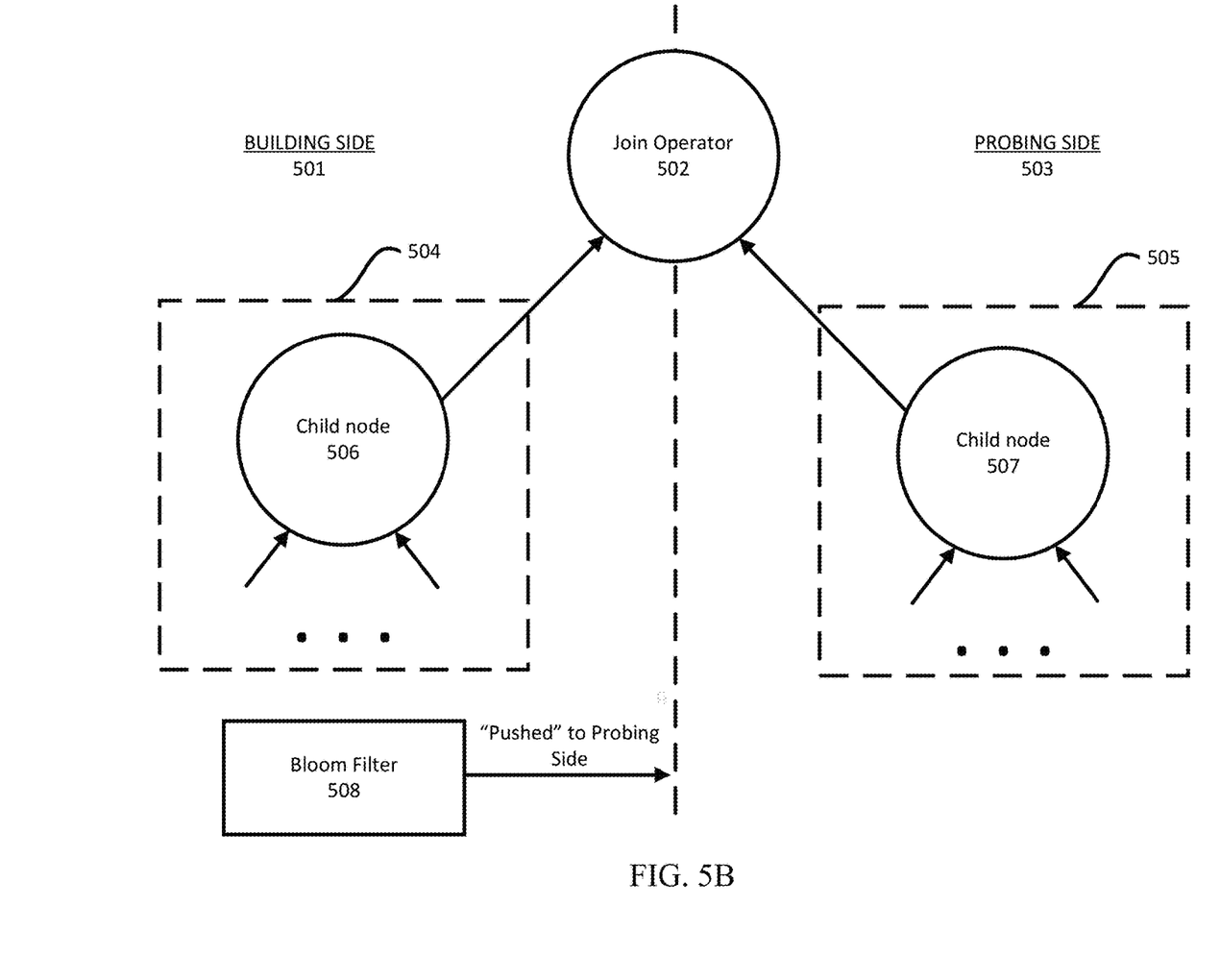
FIG. 5B shows an example Bloom filter that is generated according to aspects of the disclosure from the build side and pushed to the probe side of the query execution plan.
Figure 5C:
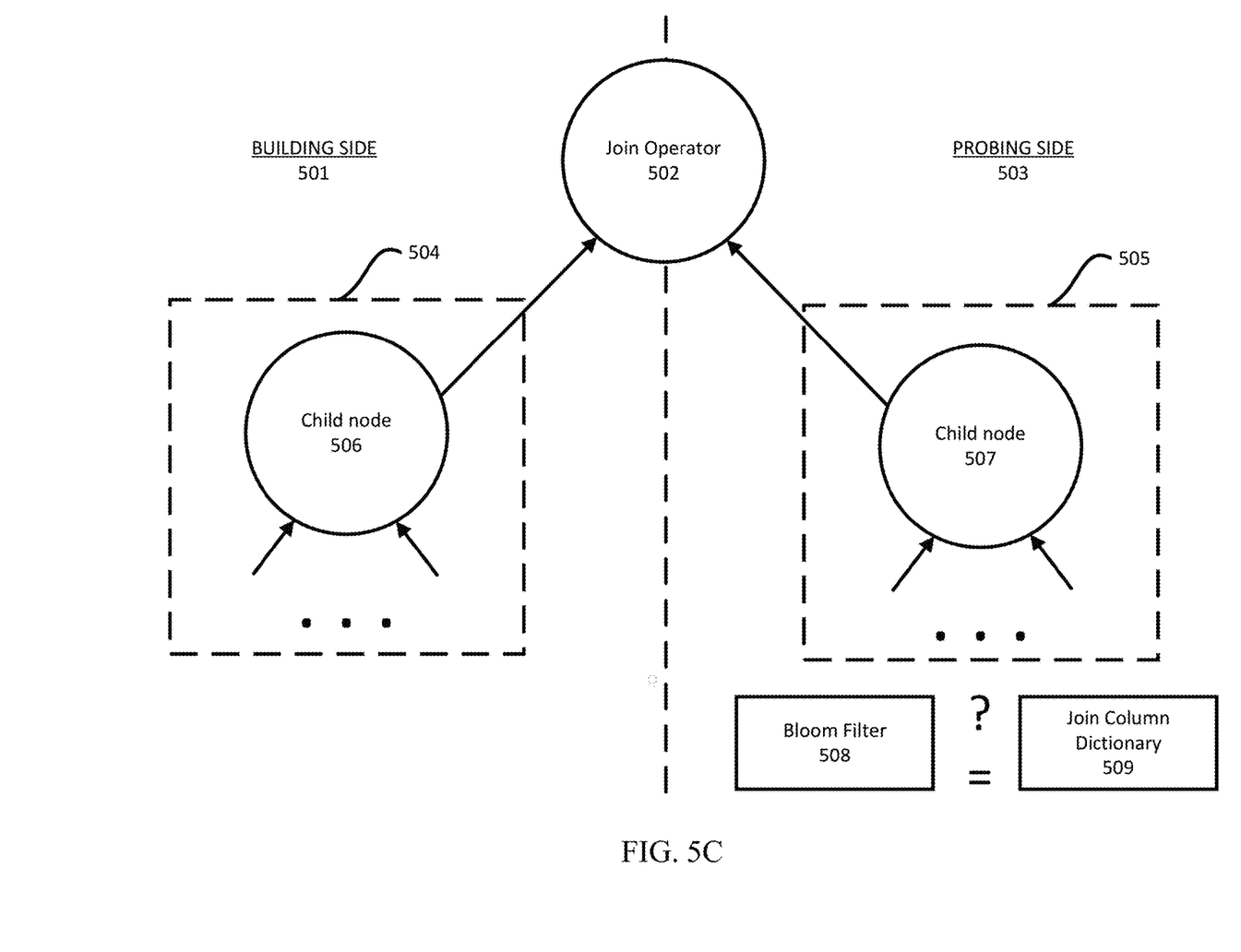
FIG. 5C shows the application of the Bloom filter with the join column dictionary of the attributes represented on the probe side.
Figure 5D:
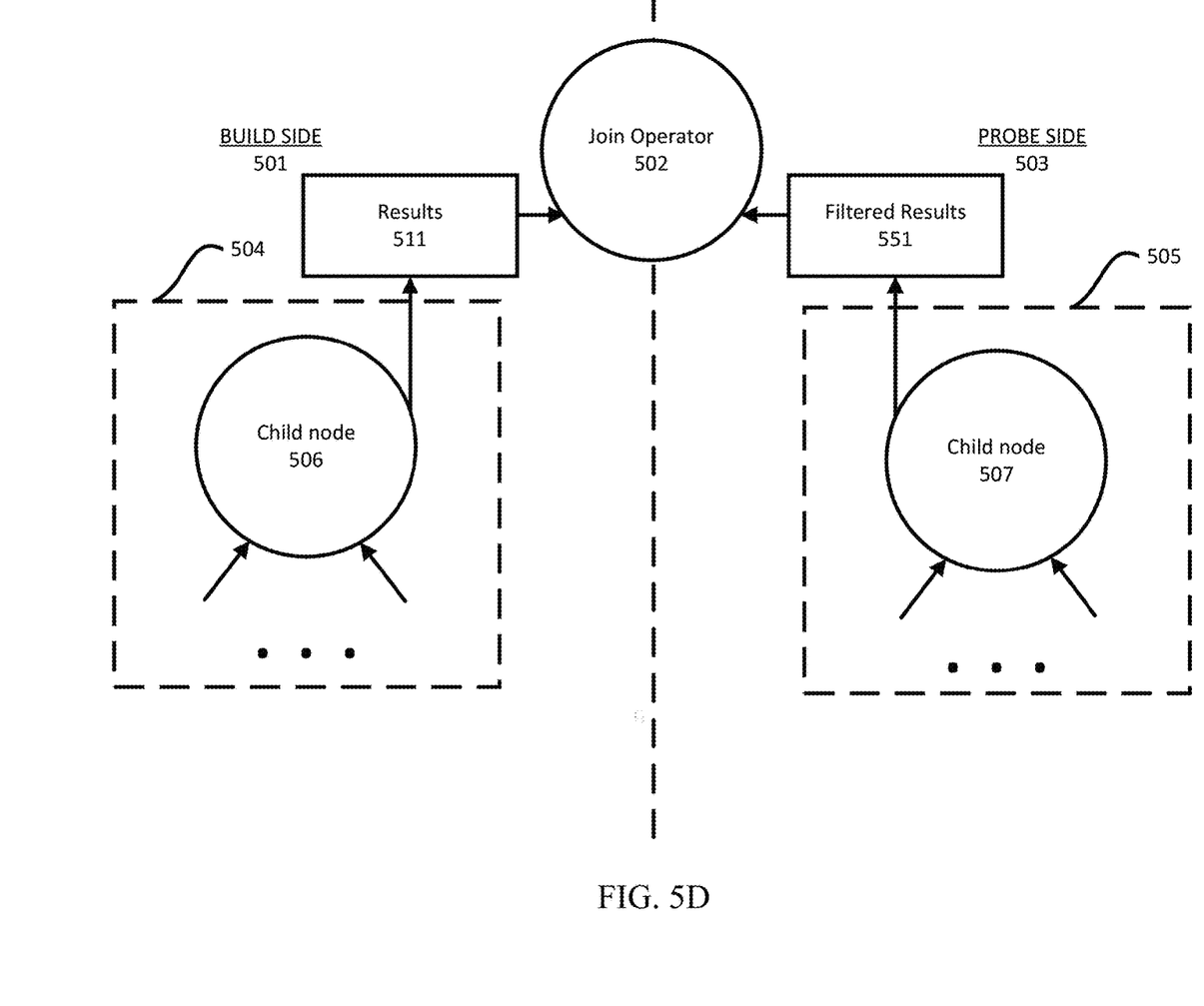
FIG. 5D shows filtered results generated as a result of the application of the Bloom filter.

FIG. 5B shows an example Bloom filter 508 that is generated according to aspects of the disclosure from the build side 501 and pushed to the probe side 503. FIG. 5C shows the application of the Bloom filter 508 with the join column dictionary 509 of the attributes represented on the probe side 503. FIG. 5D shows filtered results 551 generated as a result of the application of the Bloom filter 508. Filtered results 551 are passed to the join operator from the probe side 503, as well as results 511 from the build side 501. The results 511, 551 are then joined according of the join operator 502.

In the example of FIGS. 5A-5D, a single bloom filter is applied on the probe side. The filter may be applied at either one of a column dictionary level for filtering on dictionary rows before actual rows, or at a projection result level to filter out projected columnar scan rows. However, in other examples, more than one Bloom filter may be applied, such as applying a different Bloom filter at each of the two levels.

Example Computing Environment

Figure 6:
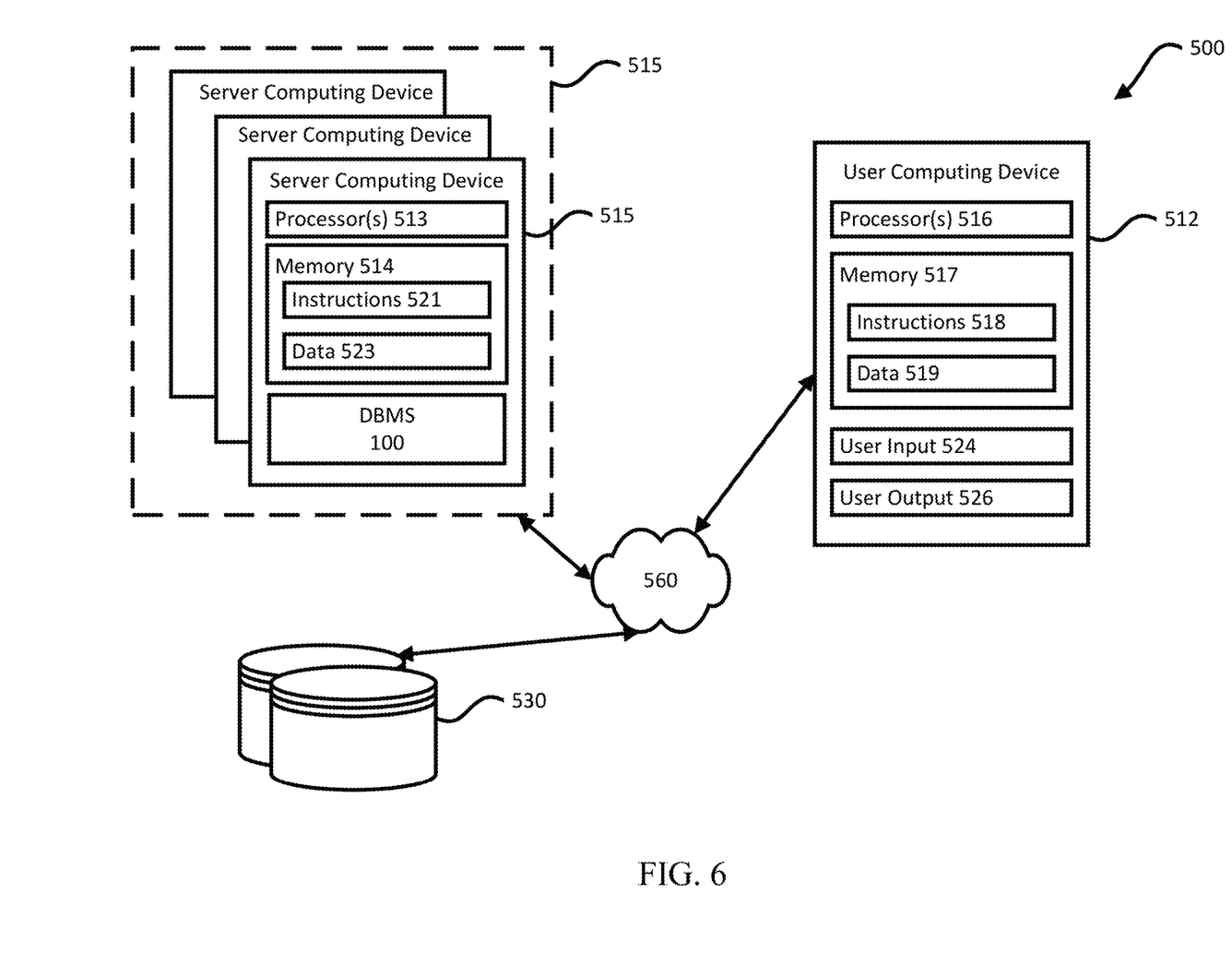
FIG. 6 is a block diagram of an example environment for implementing the DBMS.

FIG. 6 is a block diagram of an example environment 500 for implementing the DBMS 100. The DBMS 100 can be implemented on one or more devices having one or more processors in one or more locations, such as in server computing device 515. User computing device 512 and the server computing device 515 can be communicatively coupled to one or more storage devices 530 over a network 560. The storage device(s) 530 can be a combination of volatile and non-volatile memory and can be at the same or different physical locations than the computing devices 512, 515. For example, the storage device(s) 530 can include any type of non-transitory computer-readable medium capable of storing information, such as a hard-drive, solid state drive, tape drive, optical storage, memory card, ROM, RAM, DVD, CD-ROM, write-capable, and read-only memories.

The server computing device 515 can include one or more processors 513 and memory 514. The memory 514 can store information accessible by the processor(s) 513, including instructions 521 that can be executed by the processor(s) 513. The memory 514 can also include data 523 that can be retrieved, manipulated or stored by the processor(s) 513. The memory 514 can be a type of non-transitory computer-readable medium capable of storing information accessible by the processor(s) 513, such as volatile and non-volatile memory. The processor(s) 513 can include one or more central processing units (CPUs), graphic processing units (GPUs), field-programmable gate arrays (FPGAs), and/or application-specific integrated circuits (ASICs), such as tensor processing units (TPUs).

The instructions 521 can include one or more instructions that, when executed by the processor(s) 513, causes the one or more processors to perform actions defined by the instructions. The instructions 521 can be stored in object code format for direct processing by the processor(s) 513, or in other formats including interpretable scripts or collections of independent source code modules that are interpreted on demand or compiled in advance. The instructions 521 can include instructions for implementing the DBMS 100 consistent with aspects of this disclosure. The DBMS 100 can be executed using the processor(s) 513, and/or using other processors remotely located from the server computing device 515.

The data 523 can be retrieved, stored, or modified by the processor(s) 513 in accordance with the instructions 521. The data 523 can be stored in computer registers, in a relational or non-relational database as a table having a plurality of different fields and records, or as JSON, YAML, proto, or XML documents. The data 523 can also be formatted in a computer-readable format such as, but not limited to, binary values, ASCII or Unicode. Moreover, the data 523 can include information sufficient to identify relevant information, such as numbers, descriptive text, proprietary codes, pointers, references to data stored in other memories, including other network locations, or information that is used by a function to calculate relevant data.

The user computing device 512 can also be configured similar to the server computing device 515, with one or more processors 516, memory 517, instructions 518, and data 519. The user computing device 512 can also include a user output 526, and a user input 524. The user input 524 can include any appropriate mechanism or technique for receiving input from a user, such as keyboard, mouse, mechanical actuators, soft actuators, touchscreens, microphones, and sensors.

The server computing device 515 can be configured to transmit data to the user computing device 512, and the user computing device 512 can be configured to display at least a portion of the received data on a display implemented as part of the user output 526. The user output 526 can also be used for displaying an interface between the user computing device 512 and the server computing device 515. The user output 526 can alternatively or additionally include one or more speakers, transducers or other audio outputs, a haptic interface or other tactile feedback that provides non-visual and non-audible information to the platform user of the user computing device 512.

Although FIGS. 5A-5D illustrate the processors 513, 516 and the memories 514, 517 as being within the computing devices 515, 512, components described in this specification, including the processors 513, 516 and the memories 514, 517 can include multiple processors and memories that can operate in different physical locations and not within the same computing device. For example, some of the instructions 521, 518 and the data 523, 519 can be stored on a removable SD card and others within a read-only computer chip. Some or all of the instructions and data can be stored in a location physically remote from, yet still accessible by, the processors 513, 516. Similarly, the processors 513, 516 can include a collection of processors that can perform concurrent and/or sequential operation. The computing devices 515, 512 can each include one or more internal clocks providing timing information, which can be used for time measurement for operations and programs run by the computing devices 515, 512.

The server computing device 515 can be configured to receive requests to process data from the user computing device 512. For example, the environment 500 can be part of a computing platform configured to provide a variety of services to users, through various user interfaces and/or APIs exposing the platform services.

The devices 512, 515 can be capable of direct and indirect communication over the network 560. The devices 515, 512 can set up listening sockets that may accept an initiating connection for sending and receiving information. The network 560 itself can include various configurations and protocols including the Internet, World Wide Web, intranets, virtual private networks, wide area networks, local networks, and private networks using communication protocols proprietary to one or more companies. The network 560 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 560, in addition or alternatively, can also support wired connections between the devices 512, 515, including over various types of Ethernet connection.

Although a single server computing device 515, user computing device 512, and datacenter 550 are shown in FIG. 5, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that, when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

With respect to the use of substantially any plural and/or singular terms herein, for example (with the term "element" being a stand-in for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system comprising one or more processors, the one or more processors configured to:
    determine whether to perform early filtering of attributes input to a join operator before executing the join operator including:

determining a ratio between qualified records to a total row count of data sources targeted by the join operator; and perform early filtering including:
generating a list of outer and inner attributes targeted by the join operator;
generating a producer filter map and a consumer filter map by using the list of outer and inner attributes;
generating a filter for each attribute in the list of outer and inner attributes;
storing one or more generated filters in the consumer filter map;
storing a pointer of each of the one or more generated filters in the producer filter map and the consumer filter map;
using the producer filter map to fill data into the one or more generated filters, wherein the producer filter map includes data associated with the list of outer and inner attributes;
using the consumer filter map to search for one or more generated filters for one or more join conditions associated with the join operator, wherein the consumer filter map associates each of the one or more generated filters with the one or more join conditions; and
applying the one or more generated filters as part of executing a scan operator, before executing the join operator.

2. The system of claim 1, wherein the one or more generated filters are Bloom filters.

3. The system of claim 2, wherein the one or more processors are further configured to:
generate a list of inner attributes from the list of outer and inner attributes; and
store the list of inner attributes in memory.

4. The system of claim 2, wherein the one or more processors are further configured to:
determine, for an outer attribute, that a corresponding Bloom filter has been generated; and
filter the outer attribute according to the corresponding Bloom filter.

5. The system of claim 2, wherein in determining whether to perform early filtering, the one or more processors are further configured to:
determine whether the ratio satisfies a predetermined ratio.

6. The system of claim 2, wherein in determining whether to perform early filtering, the one or more processors are further configured to:
determine whether the join operator specifies the one or more join conditions in which a first child operator of the join operator has one or more tables associated with the first child operator materialized before one or more tables of a second child operator of the join operator.

7. The system of claim 2, wherein in determining whether to perform early filtering, the one or more processors are further configured to:
determine whether the join operator is a hash join operator.

8. A method comprising:
determining, by one or more processors, whether to perform early filtering of attributes input to a join operator before executing the join operator including:
determining a ratio between qualified records to a total row count of data sources targeted by the join operator; and
performing early filtering by:
generating, by the one or more processors, a list of outer and inner attributes targeted by the join operator,
generating or updating, by the one or more processors, a producer filter map and a consumer filter map, using the list of outer and inner attributes,
generating a filter for each attribute in the list of outer and inner attributes,
storing one or more generated filters in the consumer filter map,
storing a pointer of each of the one or more generated filters in the producer filter map and the consumer filter map,
using the producer filter map to fill data into the one or more generated filters, wherein the producer filter map includes data associated with the list of outer and inner attributes,
using the consumer filter map to search for one or more generated filters for one or more join conditions associated with the join operator, wherein the consumer filter map associates each of the one or more generated filters with the one or more join conditions, and
applying, by the one or more processors, the one or more generated filters as part of executing a scan operator, before executing the join operator.

9. The method of claim 8, wherein the one or more generated filters are Bloom filters.

10. The method of claim 9, wherein the method further comprises:
generating a list of inner attributes from the list of outer and inner attributes; and
storing the list of inner attributes in memory.

11. The method of claim 9, wherein the method further comprises:
determining, for an outer attribute, that a corresponding Bloom filter has been generated, and
filtering the outer attribute according to the corresponding Bloom filter.

12. The method of claim 9, wherein determining whether to perform early filtering comprises:
determining whether the ratio satisfies a predetermined ratio.

13. The method of claim 9, wherein determining whether to perform early filtering comprises:
determining whether the join operator specifies the one or more join conditions in which a first child operator of the join operator has one or more tables associated with the first child operator materialized before one or more tables of a second child operator of the join operator.

14. The method of claim 9, wherein determining whether to perform early filtering comprises:
determining whether the join operator is a hash join operator.

15. One or more non-transitory computer-readable storage media storing instructions that, when executed by one or more processors, cause the one or more processors to perform operations comprising:
determining whether to perform early filtering of attributes input to a join operator before executing the join operator including determining a ratio between qualified records to a total row count of data sources targeted by the join operator; and
performing early filtering including:
generating a list of outer and inner attributes targeted by the join operator, generating or updating a producer filter map and a consumer filter map, using the list of outer and inner attributes, generating a filter for each attribute in the list of outer and inner attributes, storing one or more generated filters in the consumer filter map, storing a pointer of each of the one or more generated filters in the producer filter map and the consumer filter map, using the producer filter map to fill data into the one or more generated filters, wherein the producer filter map includes data associated with the list of outer and inner attributes, using the consumer filter map to search for one or more generated filters for one or more join conditions associated with the join operator, wherein the consumer filter map associates each of the one or more generated filters with the one or more join conditions, and applying the one or more generated filters as part of executing a scan operator, before executing the join operator.

16. The one or more non-transitory computer-readable storage media of claim 15, wherein the one or more generated filters are Bloom filters.

17. The one or more non-transitory computer-readable storage media of claim 16, wherein the instructions cause the one or more processors to perform operations comprising:
generating a list of inner attributes from the list of outer and inner attributes; and
storing the list of inner attributes in memory.

18. The one or more non-transitory computer-readable storage media of claim 16, wherein the instructions cause the one or more processors to perform operations comprising:
determining, for an outer attribute, that a corresponding Bloom filter has been generated, and
filtering the outer attribute according to the corresponding Bloom filter.

19. The one or more non-transitory computer-readable storage media of claim 16, wherein determining whether to perform early filtering comprises:
determining whether the ratio satisfies a predetermined ratio.

20. The one or more non-transitory computer-readable storage media of claim 16, wherein determining whether to perform early filtering comprises:
determining whether the join operator specifies the one or more join conditions in which a first child operator of the join operator has one or more tables associated with the first child operator materialized before one or more tables of a second child operator of the join operator.

* * * * *